(12) United States Patent
Onogi et al.

(10) Patent No.: US 7,318,784 B2
(45) Date of Patent: Jan. 15, 2008

(54) BICYCLE DERAILLEUR

(75) Inventors: Takumi Onogi, Higashi-Osaka (JP); Takashi Adachi, Sakai (JP); Yoshihiro Kinose, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 637 days.

(21) Appl. No.: 10/871,746

(22) Filed: Jun. 17, 2004

(65) Prior Publication Data

US 2005/0192141 A1 Sep. 1, 2005

(30) Foreign Application Priority Data

Feb. 6, 2004 (JP) ............................. 2004-051492

(51) Int. Cl.
*B62M 9/12* (2006.01)
*F16H 9/24* (2006.01)

(52) U.S. Cl. .......................................... 474/82; 474/80

(58) Field of Classification Search ............ 474/78–83; D12/124; 74/475, 489; 280/257
See application file for complete search history.

(56) References Cited

U.S. PATENT DOCUMENTS

| | | | | |
|---|---|---|---|---|
| 2,598,557 | A * | 5/1952 | Juy ............................. | 474/80 |
| 3,896,679 | A * | 7/1975 | Huret et al. ................. | 474/82 |
| 4,575,365 | A | 3/1986 | Nagano ....................... | 474/80 |
| 4,637,808 | A | 1/1987 | Nakamura ................... | 474/80 |
| D424,984 | S * | 5/2000 | Hanamura ................. | D12/124 |
| 6,287,228 | B1 * | 9/2001 | Ichida ......................... | 474/82 |

FOREIGN PATENT DOCUMENTS

| | | | | |
|---|---|---|---|---|
| FR | 2520693 A1 * | 8/1983 | | |
| FR | 2637249 A1 * | 4/1990 | | |
| FR | 0461053 A1 * | 12/1991 | ................. | 474/80 |
| JP | 2000-313394 A * | 11/2000 | | |
| JP | 2002-178978 A * | 6/2002 | | |

* cited by examiner

*Primary Examiner*—Marcus Charles
(74) *Attorney, Agent, or Firm*—Jeffer Mangels Butler & Marmaro LLP

(57) ABSTRACT

An apparatus for achieving the return of a chain to a rear derailleur tension pulley more easily by means of pedaling action when the chain falls off from the tension pulley is provided. The rear derailleur is equipped with a base component, a link mechanism, a movable component, Outer Plate 20, Inner Plate 21, Guide Pulley 22, Tension Pulley 23, and Chain Return Section 32. The base component is a component which is mounted on the frame. The link mechanism is a mechanism of which one end is mounted on the base component. The movable component is a component which is mounted on the other end of the link mechanism, and which can be relatively displaced from the base component. The outer plate is a component which is mounted on the movable component so as to undulate like a see-saw. The inner plate is a component which is installed so as to face the outer plate. The guide pulley is a pulley which is mounted onto a portion on one edge of the plates, between the plates, so as to freely rotate and move in the axial direction, and which can be engaged with the chain. The tension pulley is a pulley which can be engaged with the chain, and is mounted onto a portion on the other edge of the plates, between the plates, so as to freely rotate. The chain return section is installed at a position on the inner plate which is proximal to the position at which the tension pulley is mounted, in a manner so that the clearance from the chain at this position is narrower as compared to the clearance at other positions.

20 Claims, 10 Drawing Sheets

BICYCLE DERAILLEUR

FIELD OF THE INVENTION

The present invention relates to a derailleur, in particular to a bicycle rear derailleur which is mounted onto a bicycle frame so as to selectively derail the chain resting upon any of a multiple number of sprockets mounted onto a rear hub axis.

BACKGROUND OF THE INVENTION

An externally-mounted speed changing device, or rear derailleur, is mounted onto a bicycle, especially onto a sports-type road racer or mountain bike. Such rear derailleur is equipped with a base component, which is mounted on the frame; a link mechanism, one end of which is mounted on the base component; a movable component, which is mounted on the other end of the link mechanism, and which can be relatively displaced from the aforementioned base component; and a chain guide, which is mounted on the movable component so as to undulate like a see-saw. The chain guide functions to transfer the chain, so as to derail the chain upon any of the rear sprockets. The chain guide is equipped with an outer plate, which is mounted on the movable component so as to undulate like a see-saw; an inner plate, which is installed so as to face the outer plate; a guide pulley, which is mounted onto a portion on one edge of the plates, between the plates, so as to freely rotate, and which can be engaged by means of the chain; and a tension pulley, which can be engaged with the aforementioned chain, and which is mounted onto a portion on the other edge of the aforementioned plates, between the plates, so as to freely rotate.

With respect to the rear derailleur structured according to the above-stated manner, a rear derailleur in which the guide pulley is mounted between the plates so as to freely move in the axial direction is well known. See Official Gazette for Kokai Utility Model Application In the case in which the guide pulley is mounted so as to freely move in the axial direction, even when the guide pulley does not match the center of the rear sprocket due to a failed adjustment, the guide pulley is shifted to the appropriate position by means of the chain's tension. Consequently, it becomes less likely that the chain will make noise or fall off.

In the traditional structure stated above, as an example, under conditions in which the rear derailleur is positioned at the outermost top position, when the front derailleur shifts gears from the top towards the middle, or from the middle towards the bottom, the tension of the chain suddenly decreases. At the same time, because the chain line which extends from the front chain wheel to the tension pulley becomes inclined inwards, the chain becomes subject to falling off inwards at the position close to the tension pulley. When the chain falls off from the tension pulley, the rider must stop the bicycle in order to re-derail the chain upon the tension pulley. Such re-detailing procedure is cumbersome. Especially in the midst of a race, such procedure will lead to a tremendous loss of time.

The purpose of the present invention is to achieve a return of the chain to the tension pulley more easily through pedaling actions when the chain falls off from the tension pulley.

SUMMARY OF THE PREFERRED EMBODIMENTS

In accordance with a preferred embodiment of the present invention, a Bicycle rear derailleur is provided which is mounted onto a bicycle frame in order to selectively derail the chain resting upon any of a multiple number of sprockets mounted onto a rear hub axis, and which is equipped with a base component, a link mechanism, a movable component, an outer plate, an inner plate, a guide pulley, and a tension pulley. The base component is mounted onto the frame. One end of the link mechanism is mounted onto the base component. The movable component is mounted onto the other end of the link mechanism, and can be relatively displaced from the base component. The outer plate is mounted unto the movable component so as to undulate like a see-saw. The inner plate is installed so as to face the outer plate. The guide pulley is mounted onto a portion on one edge of the plates, between the plates, so as to freely rotate and freely move in the axial direction, and can be engaged by means of the chain. The tension pulley can be engaged with the chain, and is mounted onto a portion on the other edge of the plates, between the plates, so as to freely rotate. The chain return section is installed at a position on the inner plate which is proximal to the position at which the tension pulley is mounted, in a manner so that the clearance from the chain at this position is narrower as compared to the clearance at other positions.

In this rear derailleur, when the pedals are pushed, the chain is guided from any of the sprockets of the front chain wheel, through the tension pulley, to the guide pulley to be derailed upon any one of the rear sprockets.

Under conditions in which the chain is derailed onto the smallest diameter top rear sprocket, if the front derailleur shifts down towards the smaller diameter sprockets, the tension acting on the chain suddenly decreases, and the chain is pulled inwards by the front sprocket; as a result, the chain occasionally falls off from the tension pulley. However, at the portion close to the tension pulley, the chain return section is formed as a protrusion so that the clearance from the chain at this portion is narrower than at other portions. In this structure, when the chain makes contact with the chain return section, with the chain being moved by means of pedaling action, the link component of the chain is pressed by the chain return section; consequently, the position of the chain is corrected. As a result, the chain can be returned to the tension pulley more easily.

In accordance with this embodiment, because the chain return section is formed at the portion close to the tension pulley on the inner plate as a protrusion, so that the clearance from the chain at this portion is narrower than at other portions, even when the chain falls off from the tension pulley, when the chain is continuously rotated by means of pedaling action, the link component of the chain is pressed by the chain return section; consequently, the chain can be returned to the tension pulley more easily. Therefore, even when the chain has fallen off from the tension pulley, the chain can be returned to the tension pulley by means of pedaling action.

Preferably, the chain return section is structured by means of a protrusion which is formed thicker than at other portions at the aforementioned position on the inner plate. More preferably, the chain return section is structured simply by forming a protrusion on the inner plate. Such a chain return section can be obtained at low cost.

In additional preferred embodiments, the inner plate is equipped with two arms, which extend from the position onto which the tension pulley is mounted, and an arch, which has a circular-arc shape and which connects the arms; and a chain return section, which is installed on the circular-arc shaped arch. Preferably, the chain return section is installed on the circular-arc shaped arch, such that the area which comes into contact with the chain becomes larger; therefore, the chain can be returned to the tension pulley more easily.

In other preferred embodiments, the arch is positioned in the area extending downward from and rearward of the position at which the tension pulley is mounted, and the chain return section is formed at the position which becomes the downstream when the pedals are pushed, in the area of the arch which faces the chain. In accordance with these preferred embodiments, if the chain falls off from the tension pulley, it falls off downstream of the tension pulley. Because the chain return section is installed at the downstream of the arch, the chain which has fallen off comes into contact with the chain return section when the pedals are pushed. Therefore, the chain becomes inclined to the tension pulley more easily, and thus, is more easily caught by the tension pulley.

In yet additional preferred embodiments, the inner plate is further equipped with a chain falling-off prevention mechanism, which extends in the direction of the outer plate, and the chain return section is installed at a position proximal to the chain falling-off prevention mechanism. It is particularly preferred that the chain falling-off prevention mechanism is installed at a position proximal to the chain return section, such that the chain is less likely to fall off from the tension pulley, wherein even if it falls off, it can be returned to the tension pulley more easily.

According to the present invention, because the chain return section is formed as a protrusion at the portion close to the tension pulley on the inner plate, so that the clearance from the chain at this portion is narrower than at other portions, even when the chain falls off from the tension pulley, when the chain is continuously rotated by means of pedaling action, the link component of the chain is pressed by the chain return section; consequently the chain can be returned to the tension pulley more easily. Therefore, even when the chain has fallen off from the tension pulley, the chain can be returned to the tension pulley by means of pedaling action.

DESCRIPTION OF THE PREFERRED EMBODIMENTS

Figure 1:
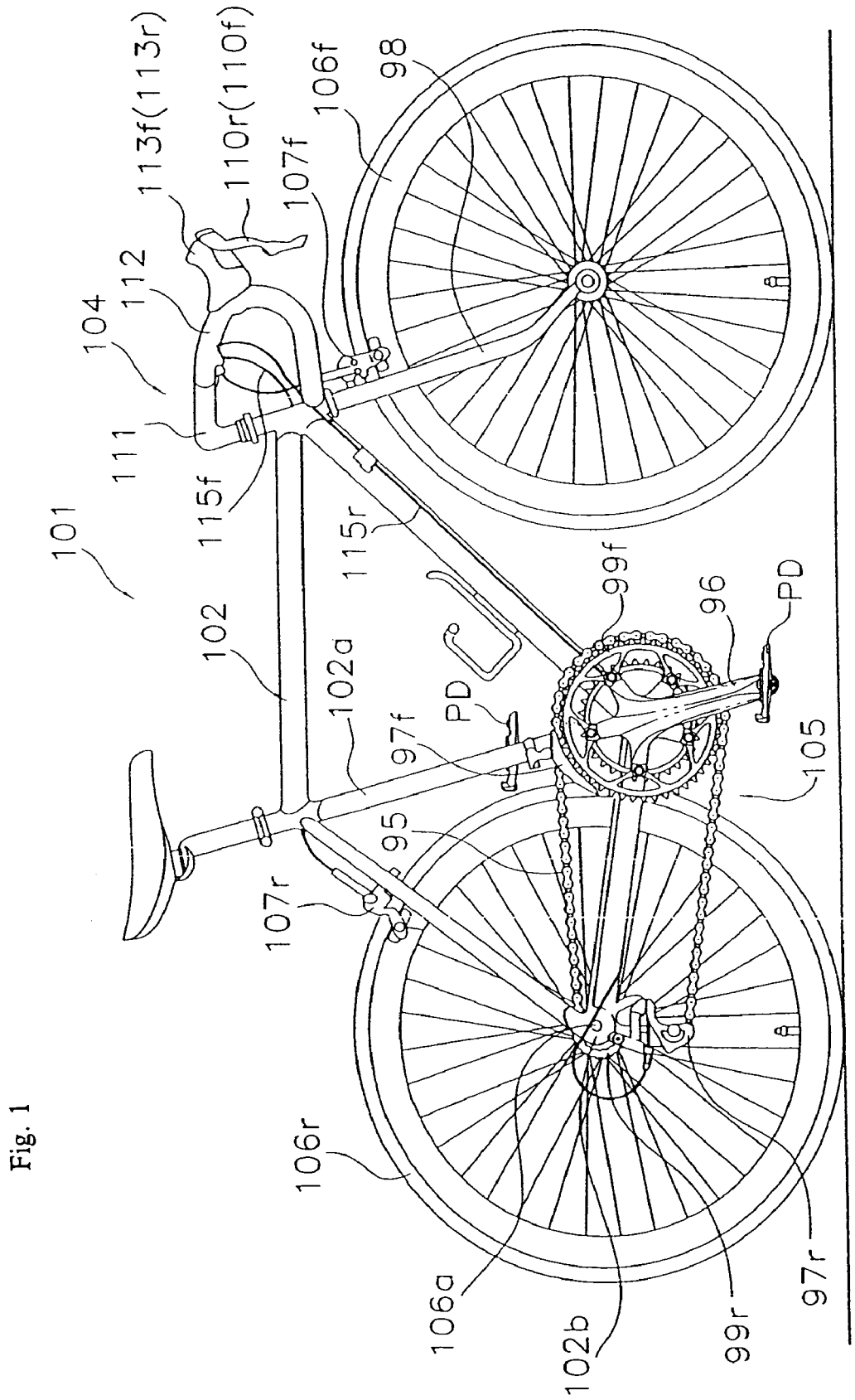
FIG. 1 is a side view of a bicycle to which a preferred embodiment of the present invention has been applied.

In FIG. 1, Bicycle 101, to which a preferred embodiment of the present invention is applied, is a road racer. The bicycle is equipped with diamond-shaped Frame 102, which is equipped with Front Fork 98; Handle 104, which is affixed to Front Fork 98; Driver 105, which consists of Crank 96 equipped with Chain 95, pedals PD, and other components, Front and Rear Derailleurs 97f and 97r, Front and Rear Sprocket Blocks 99f and 99r, and other parts; Front and Rear Wheels 106f and 106r, which are mounted on Front Fork 98 and the rear portion of Frame 102; along with Front and Rear Brakes 107f and 107r, and Gear Shifters 110f and 110r, which control the shifting of gears of the Front and Rear Derailleurs 97f and 97r.

Handle 104 is structured by means of Handle Stem 111 and Handle Bar 112, which is joined together with and affixed to the upper portion of Handle Stem 111. Handle Stem 111 is joined together with and fixated onto the upper portion of the Front Fork 98. Drop-handle type Handle Bar 112 is equipped with a pair of right and left Brake Levers 113f and 113r. Onto these Brake Bars 113f and 113r, Gear Shifters 110f and 110r are mounted. Gear Shifters 110f and 110r are connected to Front and Rear Derailleurs 97f and 97r by means of Gear Cables 115f and 115r.

Driver 105, as stated previously, includes Chain 95; Front and Rear Derailleurs 97f and 97r, which derail Chain 95 onto different gears; and Front and Rear Sprocket Blocks 99f and 99r. Front Derailleur 97f is installed on Seat Tube 102a of Frame 102, and is set at two gears by Gear Shifter 110f so as to guide Chain 95. Rear Derailleur 97r is installed on Rear Fork End 102b of Frame 102, and is set at ten gears by Gear Shifter 110f so as to guide Chain 95.

Figure 2:
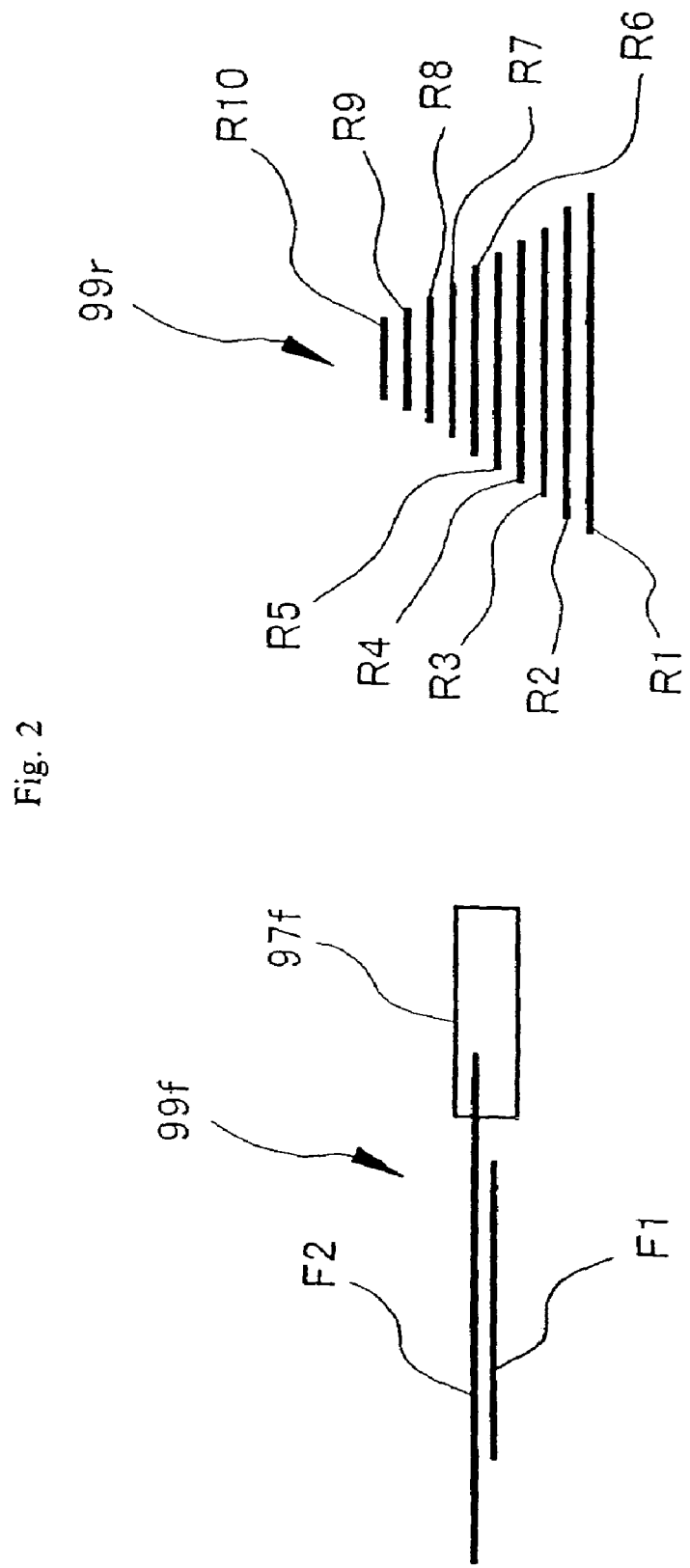
FIG. 2 is a schematic diagram showing an example of the sprocket arrangement of FIG. 1.

Front Sprocket Block 99f, as shown in FIG. 2, is equipped with two Sprockets F1 and F2, which are arranged in a line in the axial direction of the crank shaft, and which have different numbers of teeth. Rear Sprocket Block 99r is equipped with ten Sprockets R1 to R10, which are arranged in a line in the axial direction along with Hub Axis 106a of the rear wheel, and which have different numbers of teeth. Herein, inner Sprocket F1 has fewer teeth than does outer Sprocket F2. Moreover, the number of teeth gradually decreases as the sprockets advance from innermost Sprocket R1; the outermost top Sprocket R10 has the fewest number of teeth. Front and Rear Derailleurs 97f and 97r derail Chain 95 onto either one of the multiple Sprockets, F1 and F2, and R1 to R10, in order to shift gears. This gear shift is conducted by Gear Shifters 110f and 110r, by utilizing Brake Levers 113f and 113r.

Figure 3:
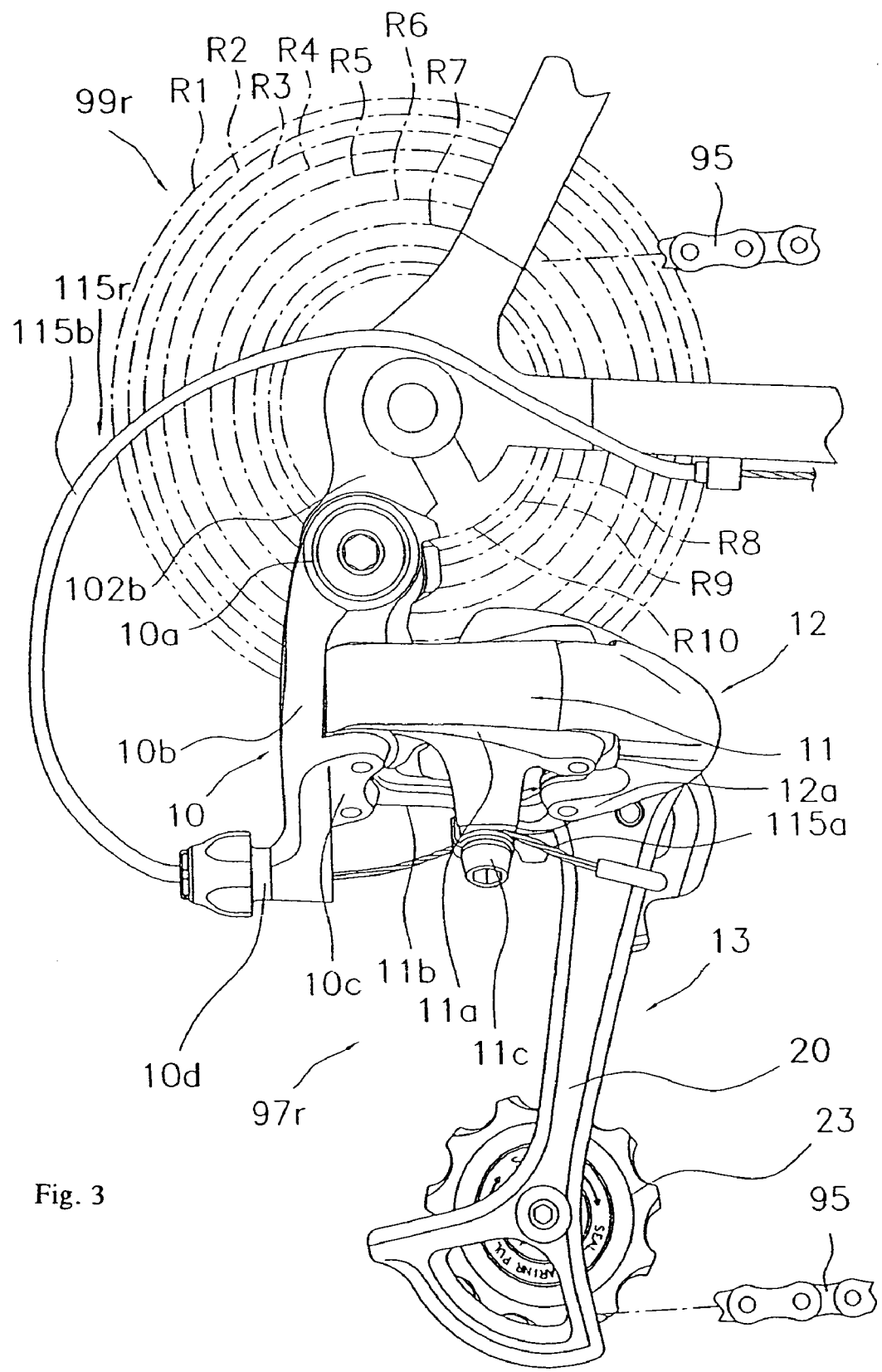
FIG. 3 is a side view of the rear derailleur according to a preferred embodiment of the present invention.
Figure 4:
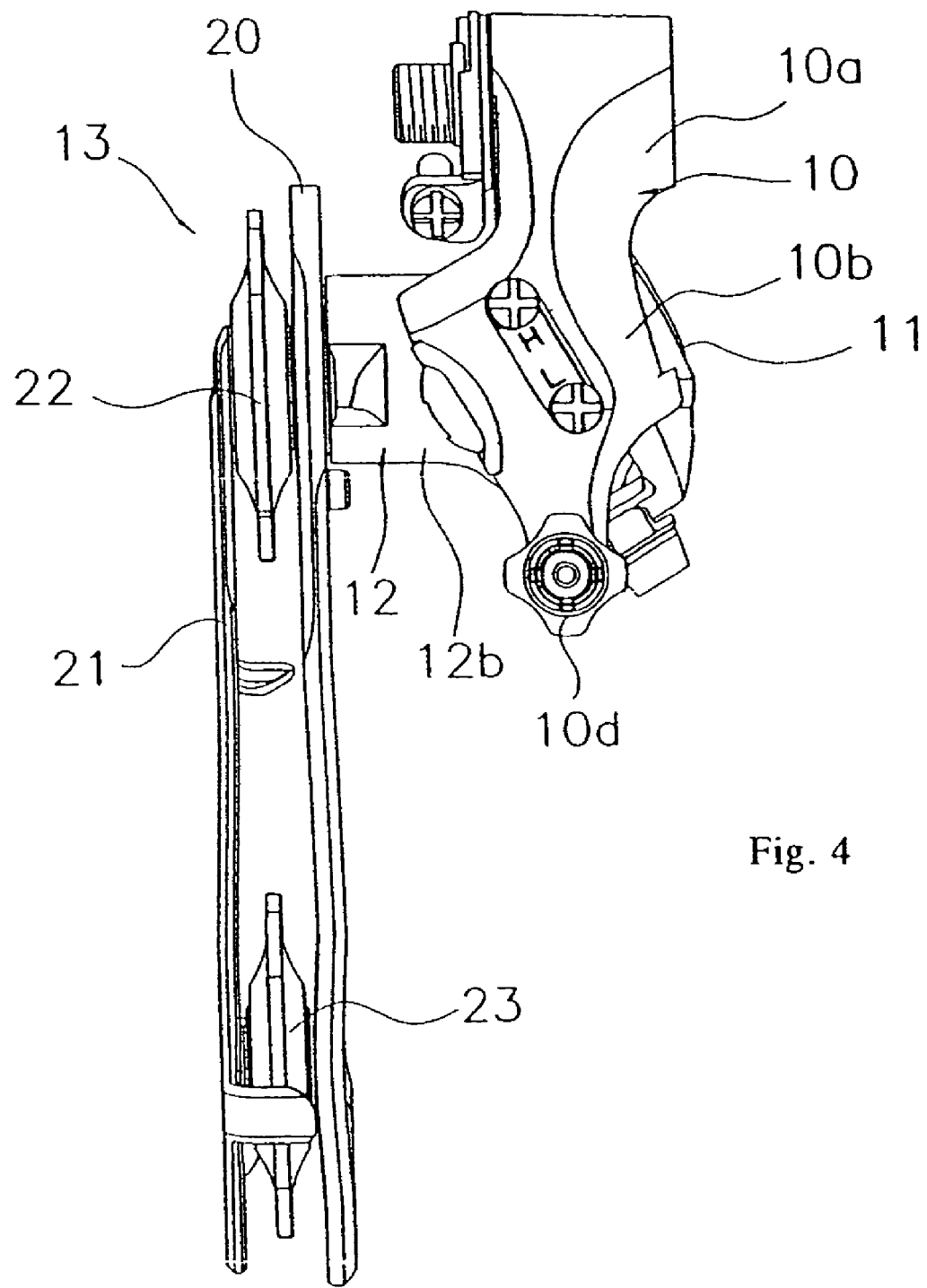
FIG. 4 is a back view of the above.

Rear Derailleur 97r is mounted onto Rear Fork End 102b, formed on the rear portion of Frame 102; it selectively derails Chain 95 upon either one of the multiple Sprockets R1 to R10 in Rear Sprocket Block 99r. As shown in FIGS. 3 and 4, Rear Derailleur 97r is equipped with Base Component 10, which is screwed into and mounted onto Fork End 102b; Link Mechanism 11, one end of which is mounted onto Base Component 10; Movable Component 12, which is mounted onto another end of Link Mechanism 11 and which can be relatively displaced from Base Component 10; and Chain Guide 13, which is mounted unto Movable Component 12 so as to undulate like a see-saw. Chain Guide 13 functions to shift Chain 95, so that Chain 95 becomes derailed upon any of Sprockets R1 to R10.

As shown in FIGS. 3 and 4, Base Component 10 is equipped with Boss 10a, which is cylindrical in shape, and which is screwed into Fork End 102b of Frame 102; as well as Arm 10b, which extends from Boss 10a in the radial direction. On the point of Arm 10b, Link Supporter 10c, which functions to mount Link Mechanism 11, is formed. Moreover, on the point of Arm 10b, Outer Latch 10d, which functions to latch Outer Casing 115b of Gear Cable 115r, is formed.

Link Mechanism 11 is a four-point link mechanism, in which Movable Component 12 is connected to Base Component 10 in such a manner that Movable Component 12 may be relatively displaced from Base Component 10. Link Mechanism 11 is equipped with External Link Component 11a and Internal Link Component 11b, one end of which is mounted to the lower edge of Base Component 10 through Link Supporter 10c so as to undulate like a see-saw. The other end of these Link Components 11a and 11b is mounted to Link Supporter 12a of Movable Component 12 (stated later), so as to undulate like a see-saw. Link Components 11a and 11b are energized by means of coil springs (not shown in the figures), installed so that they mutually face each other towards the smallest diameter Sprocket R10. On External Link Component 11a, Inner Latch 11c, which functions to latch Inner Cable 115a of Gear Cable 115r, is formed.

Movable Component 12 functions to mount Chain Guide 13 on an axis substantially parallel to Hub Axis 106a of Rear Wheel 106r, so as to undulate like a see-saw. Movable Component 12 is equipped with Link Supporter 12a, on which both Link Components 11a and 11b of the Link Mechanism are mounted so as to undulate like a see-saw. Movable Component 12 is also equipped with Guide Mounting Unit 12b, on which Chain Guide 13 is mounted so as to undulate like a see-saw. On the inside of Guide Mounting Unit 12b, a torsion coil spring (not shown in Figures) is mounted, and Chain Guide 13 is energized by means of the torsion coil spring in a clockwise direction, as seen from the outside. With this structure, tension is placed onto Chain 95, so that Chain 95 is less likely to fall off from Sprockets R1 to R10.

Figure 5:
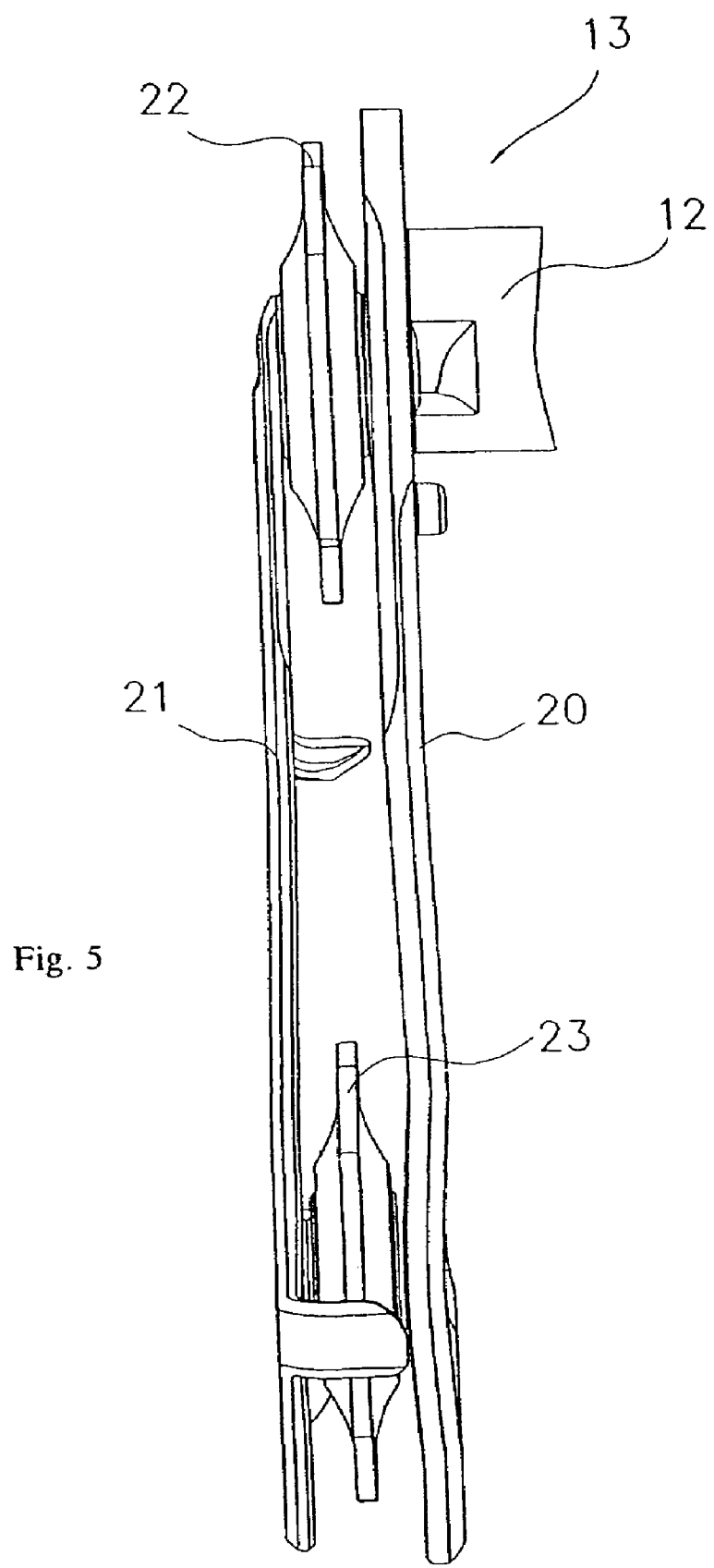
FIG. 5 is a back view of the chain guide.

As shown in FIG. 5, Chain Guide 13 is equipped with Outer Plate 20, which is mounted on Movable Component 12 so as to undulate like a see-saw; Inner Plate 21, which is installed so as to face Outer Plate 20; Guide Pulley 22, which is mounted onto a portion on one edge of Outer Plate 20 and Inner Plate 21, between the plates, so as to freely rotate and move in the axial direction, and which can be engaged with the chain; and Tension Pulley 23, which can be engaged with Chain 95, and which is mounted onto a portion on the other edge of Outer Plate 20 and Inner Plate 21, between the plates, so as to freely rotate.

Figure 6:
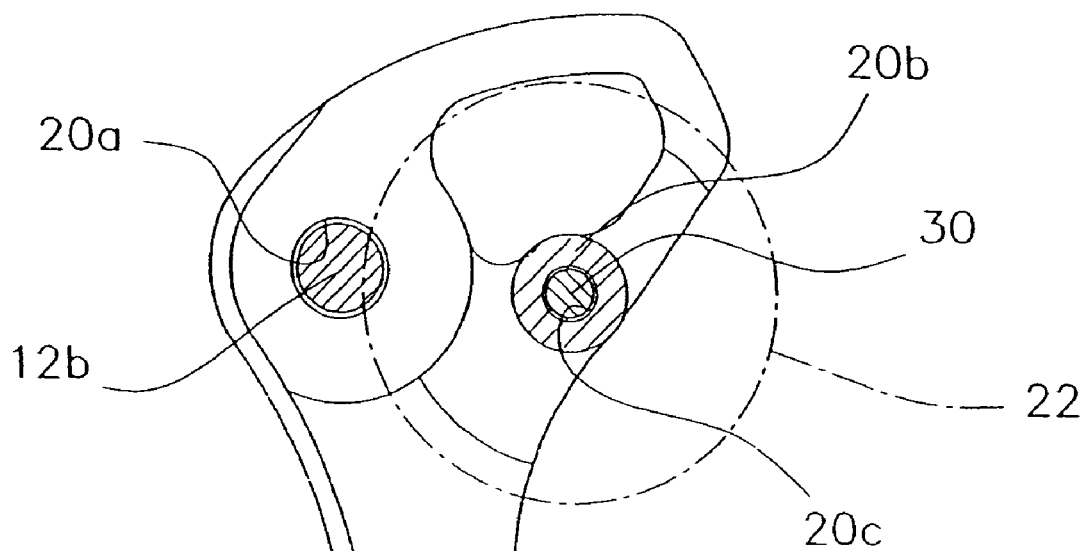
FIG. 6 is a right side view of the outer plate.
Figure 6:
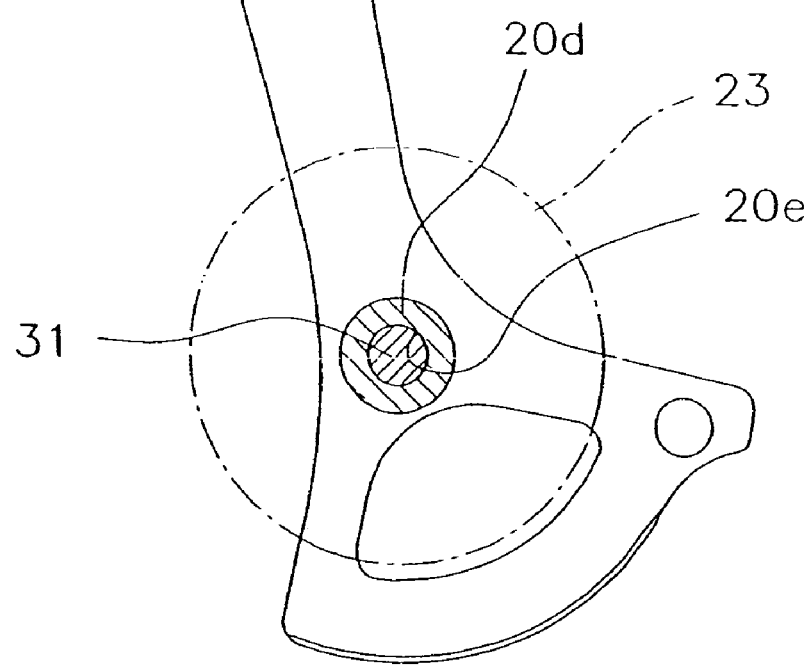
Figure 7:
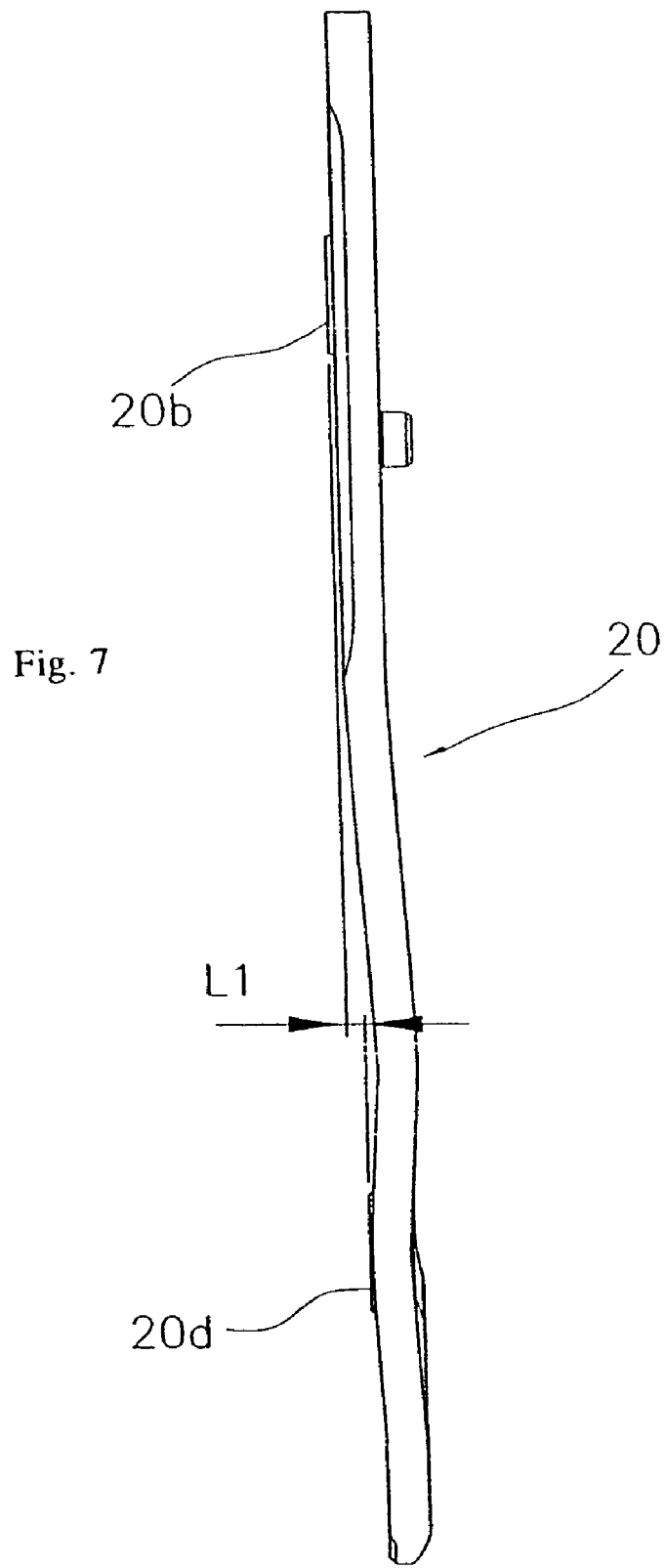
FIG. 7 is a back view of the above.
Figure 10:
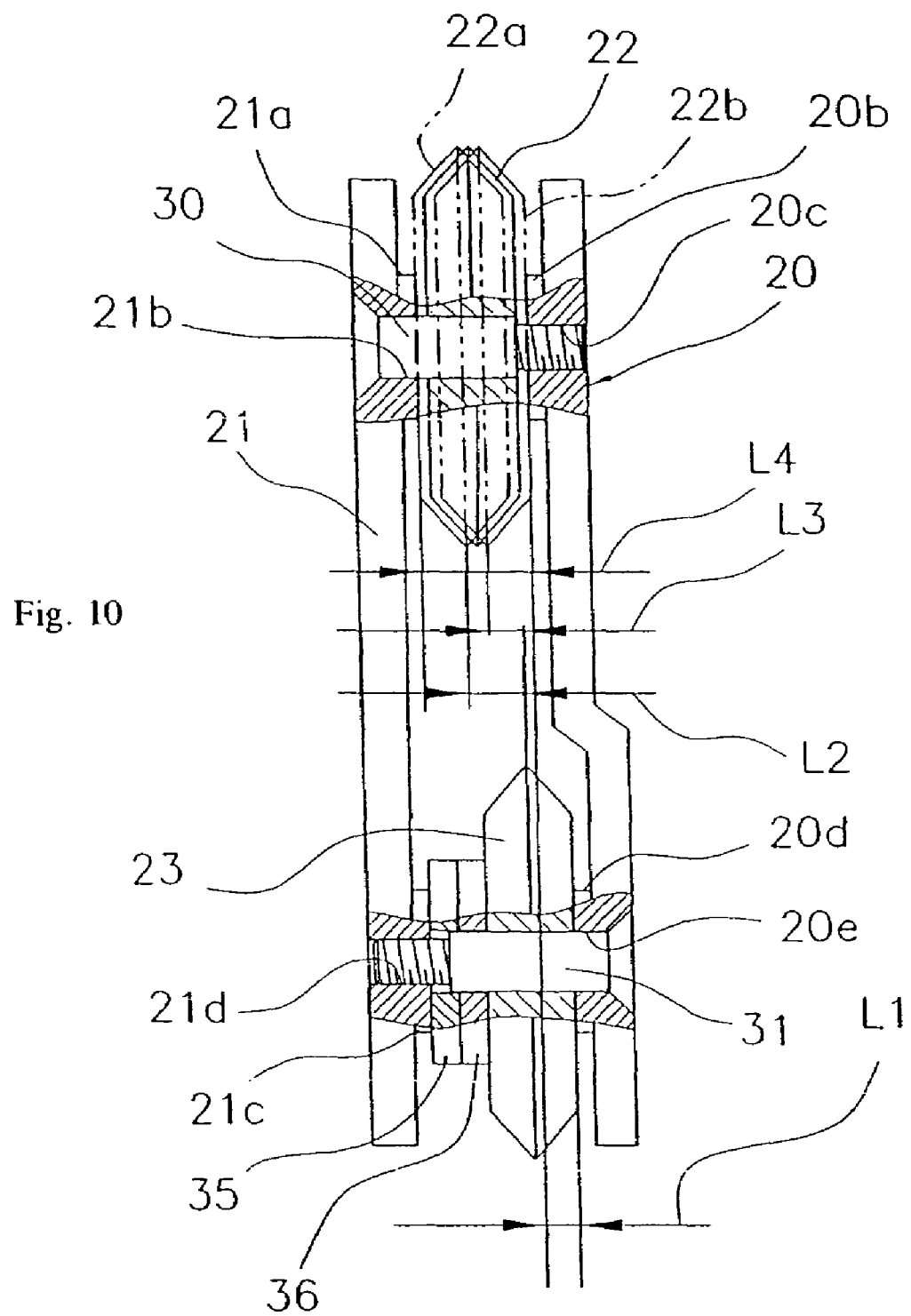
FIG. 10 is a schematic back partial cross-sectional view.

As shown in FIGS. 6, 7, and 10, Outer Plate 20 is a component which is formed by the press-molding of light-weight metals, such as aluminum alloy. FIG. 6 is a view of Outer Plate 20 as seen from the inside. The lower end of Outer Plate 20 slightly curves outwards as compared to the other end. On one end of Outer Plate 20, Undulation Supporter 20a, which is mounted onto Movable Component 12 so as to undulate like a see-saw, is formed. Moreover, next to Undulation Supporter 20a, First Boss 20b, which supports Guide Pulley 22 in a freely rotatable manner, is formed. On First Boss 20b, Female Screw 20c, into which Supporting Axis 30 of Guide Pulley 22 is screwed, is formed. On another end of Outer Plate 20, Second Boss 20d, which supports Tension Pulley 23 in a freely rotatable manner, is formed. On Second Boss 20d, Pass-through Hole 20e, through which Supporting Axis 31 which supports Tension Pulley 23 passes, is formed. Second Boss 20d is positioned at a position offset outwards from First Boss 20b by Distance L1. This Distance L1 lies in a range from 1 mm to 1.5 mm, and is preferably approximately 1.25 mm.

Figure 8:
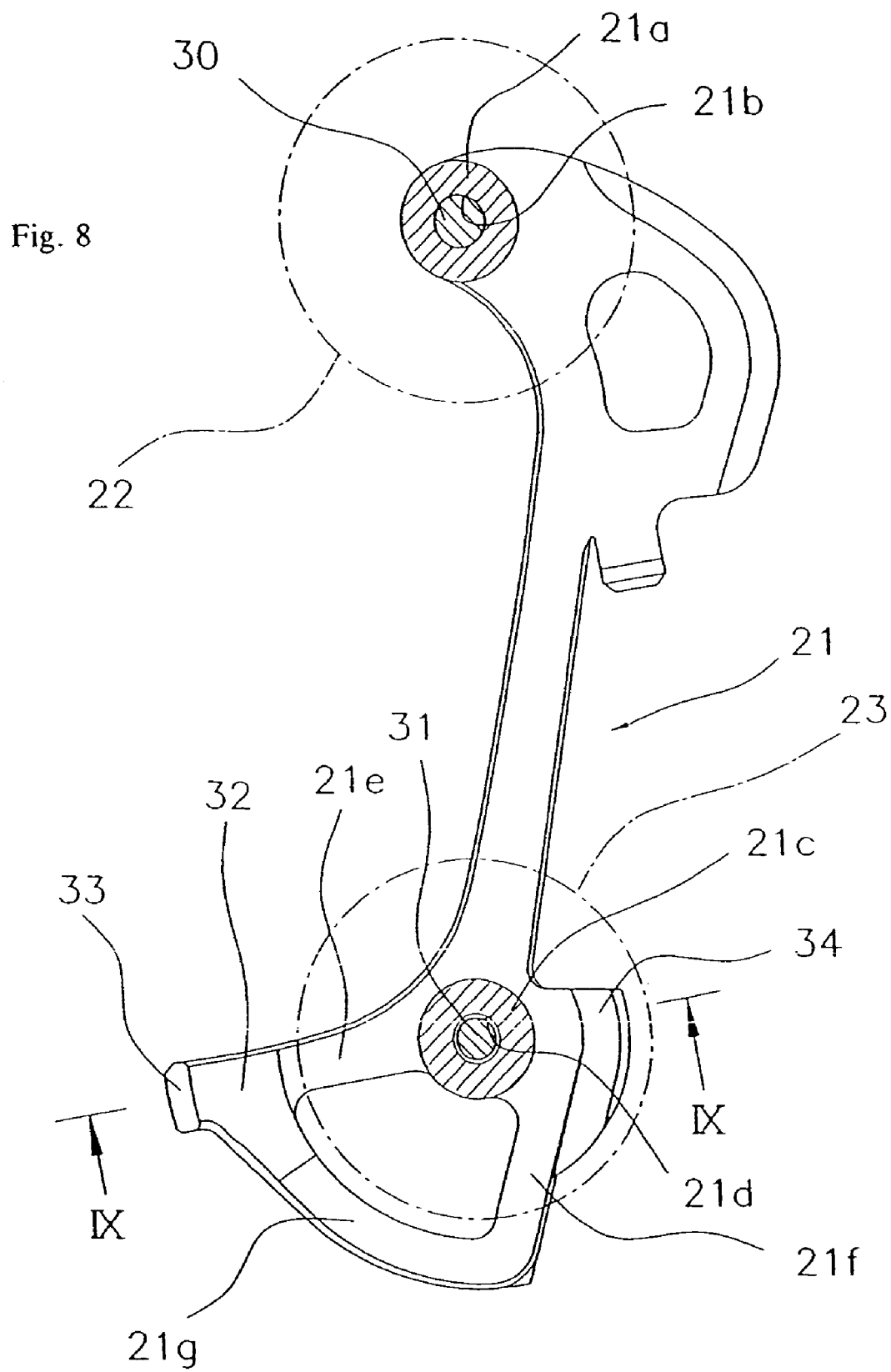
FIG. 8 is a left side view of the inner plate.
Figure 9:
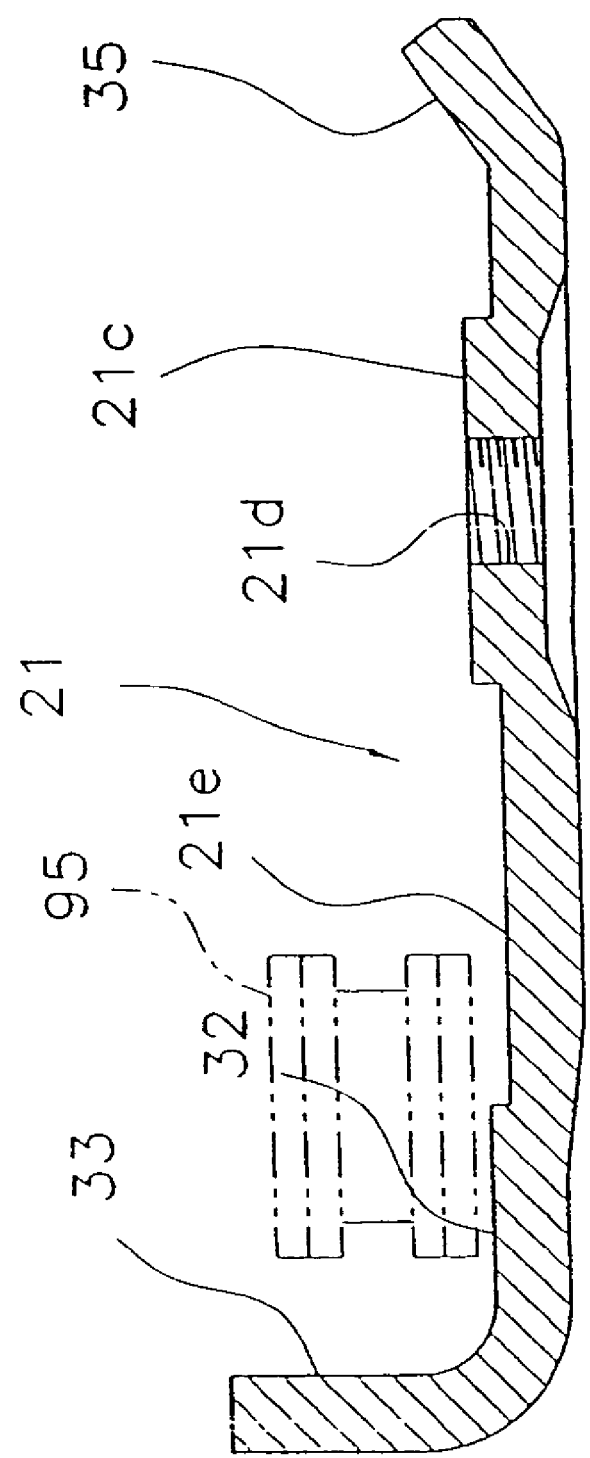
FIG. 9 is an IX-IX cross-sectional view of FIG. 8.

As shown in FIGS. 8 and 9, Inner Plate 21 is a component which is formed by the press-molding of light-weight metals, such as aluminum alloy. Moreover, FIG. 8 is a view of Inner Plate 21 as seen from the outside. On one end of Inner Plate 21, First Boss 21a is formed at a position facing First Boss 20b of Outer Plate 20. On First Boss 21a, Pass-through Hole 21b, through which Supporting Axis 30 supporting Guide Pulley 22 passes, is formed. On another end of Inner Plate 21, Second Boss 21c, which supports Tension Pulley 23 in a freely rotatable manner, is formed. On Second Boss 21c, Female Screw 21d, into which Supporting Axis 31 which supports Tension Pulley 23 is screwed, is formed. First Boss 21a and Second Boss 21c are formed so as to be positioned on the same plane.

In the area surrounding Second Boss 21c of Inner Plate 21, two Arms 21e and 21f, which extend from Second Boss 21c; and Arch 21g, which takes a circular-arc shape and connects Arms 21e and 21f, are formed. Arch 21g is positioned in the area extending downward from and rearward of Second Boss 21c.

With regards to the area of Arch 21g which faces Chain 95, at the position which becomes the downstream when the pedals are pushed in the normal rotational direction (in the traveling direction), Chain Return Section 32 is formed. Chain Return Section 32 is formed in order to assist the chain to return to Tension Pulley 23 through pedaling action when the tension placed on Chain 95 becomes weaker and Chain 95 falls off. Chain Return Section 32 is formed in such a manner that the clearance from Chain 95 is narrower at the position proximal to Second Boss 21c, onto which Tension Pulley 23 is mounted, as compared to the clearance at other portions. Specifically, Chain Return Section 32 is structured by a protrusion which is formed thicker than at other portions on Arch 21g.

On the rear portion of Chain Return Section 32, Chain Falling-off Prevention Mechanism 33, which is formed by bending the portion outwards, is installed. Chain Falling-off Prevention Mechanism 33 is installed in order to prevent Chain 95 from falling off from Tension Pulley 23. Specifically, this mechanism prevents Chain 95 from falling off backwards. On the front of Chain Return Section 32, Contact Prevention Mechanism 34, which prevents Inner Plate 21 from coming into contact with the spoke of Rear Wheel 106r when it undulates forwards, is installed.

Guide Pulley 22 is capable of aligning the engagement center of Chain 95 to the engagement center of any of Sprockets R1 to R10, and is installed in order to guide Chain 95 to any of Sprockets R1 to R10. Guide Pulley 22 is mounted onto Supporting Axis 30 by means of a ball bearing (not shown in Figures) in a freely rotatable manner. As illustrated in FIG. 10, the Guide Pulley is mounted between First Bosses 20b and 21a. Clearance L4 between First Bosses 20b and 21a is set wider by 1 mm to 1.5 mm than the maximum width of Guide Pulley 22. Therefore, Guide Pulley 22 is mounted onto Supporting Axis 30 so as to move in the axial direction by a maximum of 1.5 mm.

Tension Pulley 23 is installed in order to apply tension to Chain 95. Tension Pulley 23 is mounted onto Supporting Axis 31 by means of a ball bearing (not shown in the figures) in a freely rotatable manner. Between Second Boss 20d and Second Boss 21c, Tension Pulley 23 is deflected towards Second Boss 20d, and is arranged so that it cannot move in the axial direction. Therefore, as an example, two Washers 35 and 36 are mounted between Second Boss 21c and Tension Pulley 23. When Guide Pulley 22 is located at a position closest to Outer Plate 20, the engagement center of the Tension Pulley 23 is offset from the engagement center of Guide Pulley 22 by more than 0.5 mm in a direction towards Outer Plate 20 (the position of the Guide Pulley 22b is shown by the two-dot-chain line in FIG. 10). FIG. 10 shows the offset at this time by Distance L3. Furthermore, when Guide Pulley 22 is located at a position closest to Inner Plate 21, the engagement center of Tension Pulley 23 is offset from the engagement center of Guide Pulley 22 by less than 2.0 mm in a direction towards Outer Plate 20 (the position of Guide Pulley 22a is shown by the two-dot-chain line in FIG. 10). FIG. 10 shows the offset at this time by Distance L2.

In Rear Derailleur 97r structured as stated above, when Inner Cable 115a of Gear Cable 115r is pulled by Gear Shifter 110r, Chain Guide 13 is shifted inwards lower by means of Link Mechanism 11—namely to Sprocket R1; thus, it is loosened outwards towards the top—namely to Sprocket R10.

Under conditions in which Chain 95 is derailed onto the top Sprocket F2 on the front, and onto the top Sprocket R10 on the rear, if the gear is shifted downwards by means of Gear Shifter 110f, Chain Guide 13 suddenly undulates forward, and the tension placed on Chain 95 becomes weak. In such case, the tension becomes weak because Chain 95 is pulled inwards, and Chain 95 occasionally falls off from Tension Pulley 23. Because the chain used for gear shifting is designed to be flexible so that gear shifting can be conducted easily, it occasionally falls off under such conditions. In such cases, Chain Return Section 32 is formed as a protrusion so that the clearance from Chain 95 at this portion is narrower than at other portions, and Chain 95 is pressed by means of Chain Return Section 32 when Chain 95 travels towards Guide Pulley 22 by means of pedaling action. Because of this, the position of Chain 95 is corrected outwards, becomes inclined towards Tension Pulley 23, and thus is caught by Tension Pulley 23 more easily. As a result, Chain 95, which has fallen off from Tension Pulley 23, can be returned more easily without stopping Bicycle 101.

Furthermore, when the tension becomes weak, the movement of Guide Pulley 22 in the axial direction might be hindered. However, in this preferred embodiment, because the engagement center of Tension Pulley 23 is set at a position closer to Outer Plate 20 than to the engagement center of Guide Pulley 22, Guide Pulley is pulled by Chain 95 outwards more easily; therefore, Guide Pulley 22 moves outwards more easily even when the tension of Chain 95 is weak. Therefore, Chain 95 can be guided to either one of Sprockets R1 to R10 more smoothly.

In the foregoing preferred embodiments, a manually-operated rear derailleur for a road racer was described. However, the present invention is not limited to this example, and can be applied to any rear derailleur, as long as it is equipped with a guide pulley and a tension pulley. It may also be electrically operated. Additionally, in the foregoing preferred embodiments, the chain return section is structured as a protrusion formed on the inner plate. However, other objects may be affixed on the inner plate so as to directly make contact with the chain.

The foregoing embodiments are merely examples of the present invention. Those skilled in the art may make numerous uses of, and departures from, such embodiments without departing from the spirit and the scope of the present invention. Accordingly, the scope of the present invention is not to be limited to or defined by such embodiments in any way, but rather, is defined solely by the following claims.

What is claimed is:

1. A bicycle rear derailleur, which is mounted on a bicycle frame so as to selectively derail the chain resting upon any of a multiple number of sprockets mounted on a rear hub axis, which is equipped with a base component, which is mounted onto the aforementioned frame; a link mechanism, one end of which is mounted on the aforementioned base component; a movable component, which is mounted on an other end of the aforementioned link mechanism, and which can be relatively displaced from the aforementioned base component; an outer plate, which is pivotally mounted on the aforementioned movable component; an inner plate, which is installed so as to face the aforementioned outer plate; a guide pulley, which is mounted onto a portion on one edge of the aforementioned plates, between the aforementioned plates, so as to freely rotate and move in the axial direction, and which can be engaged by means of the aforementioned chain; a tension pulley, which can be engaged with the aforementioned chain, and which is mounted onto a portion on another edge of the aforementioned plates between the aforementioned plates so as to freely rotate; wherein the inner plate includes a chain return section and a portion away from the chain return section, wherein the aforementioned chain return section is structured by a protrusion which is formed thicker than the portion of the inner plate away from the chain return section.

2. The bicycle rear derailleur of claim 1, wherein the aforementioned inner plate is equipped with two arms, which extend from the position onto which the aforementioned tension pulley is mounted, and an arch, which has a circular-arc shape and which connects the aforementioned arms, the aforementioned chain return section is installed on the aforementioned circular-arc shaped arch.

3. The bicycle rear derailleur of claim 2, wherein the aforementioned arch is positioned in the area extending downward from and rearward of the position at which the aforementioned tension pulley is mounted; and the aforementioned chain return section is formed at the position which becomes the downstream when the pedals are pushed, in the area of the arch which faces the chain.

4. The bicycle rear derailleur of claim 2, wherein the aforementioned inner plate is further equipped with a chain falling-off prevention mechanism, which extends in the direction of the aforementioned outer plate; the aforementioned chain return section is installed at a position proximal to the aforementioned chain falling-off prevention mechanism.

5. The bicycle rear derailleur of claim 3, wherein the aforementioned inner plate is further equipped with a chain falling-off prevention mechanism, which extends in the direction of the aforementioned outer plate; the aforementioned chain return section is installed at a position proximal to the aforementioned chain falling-off prevention mechanism.

6. The bicycle rear derailleur of claim 1, wherein the aforementioned inner plate is equipped with two arms, which extend from the position onto which the aforementioned tension pulley is mounted, and an arch, which has a circular-arc shape and which connects the aforementioned arms, the aforementioned chain return section is installed on the aforementioned circular-arc shaped arch.

7. The bicycle rear derailleur of claim 6, wherein the aforementioned arch is positioned in the area extending downward from and rearward of the position at which the aforementioned tension pulley is mounted; and the aforementioned chain return section is formed at the position which becomes the downstream when the pedals are pushed, in the area of the arch which faces the chain.

8. The bicycle rear derailleur of claim 7, wherein the aforementioned inner plate is further equipped with a chain falling-off prevention mechanism, which extends in the direction of the aforementioned outer plate; the aforementioned chain return section is installed at a position proximal to the aforementioned chain falling-off prevention mechanism.

9. The bicycle rear derailleur of claim 6, wherein the aforementioned inner plate is further equipped with a chain falling-off prevention mechanism, which extends in the direction of the aforementioned outer plate; the aforementioned chain return section is installed at a position proximal to the aforementioned chain falling-off prevention mechanism.

10. The bicycle rear derailleur of claim 1, wherein the aforementioned inner plate is further equipped with a chain falling-off prevention mechanism, which extends in the direction of the aforementioned outer plate; the aforementioned chain return section is installed at a position proximal to the aforementioned chain falling-off prevention mechanism.

11. The bicycle rear derailleur of claim 1, wherein the aforementioned inner plate is further equipped with a chain falling-off prevention mechanism, which extends in the direction of the aforementioned outer plate; the aforementioned chain return section is installed at a position proximal to the aforementioned chain falling-off prevention mechanism.

12. A bicycle derailleur, comprising:
   a. a plate including a chain return section and a portion away from said chain return section;
   b. a pulley mounted to said plate, said pulley having a center and defining a radial direction, said pulley further defining a plane through said center in said radial direction, said plane and said chain return section defining a first distance therebetween, and said plane and said portion of said plate away from said chain return section defining a second distance therebetween, wherein said first distance is less than said second distance, and wherein said portion away from said chain return section is closer to the center of said pulley than said chain return section.

13. The bicycle derailleur of claim 12, wherein said plate has a pulley mounting location and further comprises first and second arms extending from said mounting location, said plate further comprising an arc connecting said first and second arms, wherein said arc defines said chain return section.

14. The bicycle derailleur of claim 12, wherein said plate further comprises a chain retention structure, said chain retention structure extending away from said chain return section towards said plane.

15. A bicycle derailleur, comprising:
   a. a plate including a chain return section and a portion away from said chain return section;
   b. a pulley mounted to said plate, said pulley having a center and defining a radial direction, said pulley further defining a plane through said center in said radial direction, said plane and said chain return section defining a first distance therebetween, and said plane and said portion of said plate away from said chain return section defining a second distance therebetween, wherein said first distance is less than said second distance, and wherein said chain return section includes a protrusion defining a first thickness, said portion of said plate away from said chain return section defines a second thickness, and said first thickness is greater than said second thickness.

16. A method of assembling a bicycle rear derailleur, comprising:
   a. providing a pulley having a center mounted to a plate, said plate having first and second sections, wherein said second section is closer to said pulley center than said first section;
   b. providing a bicycle chain;
   c. engaging said chain and said pulley to define a first distance between said chain and said first section of said plate and a second distance between said chain and said second section of said plate, such that said first distance is less than said second distance.

17. The method of claim 16, wherein said plate includes a pulley mounting location and further comprises first and second arms extending from said mounting location, said plate further comprising an arc connecting said first and second arms, wherein said arc defines said first distance.

18. The method of claim 17, wherein said plate further comprises a chain retention structure, said pulley has a center and defines a radial direction, said pulley further defines a plane through said center in said radial direction, and wherein said chain retention structure extends from said arc in a direction towards said plane.

19. A bicycle rear derailleur, comprising:
   a. a base component adapted to be mounted to a bicycle frame;
   b. a link mechanism having a first end connected to said base component and further having a second end;
   c. a movable component connected to said second end of said link mechanism, said movable component being adapted for relative displacement away from said base component;
   d. a plate assembly, comprising an inner plate and an outer plate, said outer plate being connected to said movable component and said inner plate being connected to said outer plate, said inner plate defining a guide pulley section and a tension pulley section;
   f. a guide pulley rotatably connected to said plate assembly between said inner plate and said outer plate and located at said guide pulley section, wherein said guide pulley defines an axial direction, and wherein said guide pulley is movable along said axial direction between said inner plate and said outer plate;
   g. a tension pulley, located at said tension pulley section and between said inner plate and said outer plate, said tension pulley being rotatable between said inner and outer plate;
   wherein said tension pulley section of said inner plate further comprises a chain return section and a portion away from said chain return section, said tension pulley has a center and defines a radial direction, said portion away from said chain return section is closer to said tension pulley center than said chain return section, said tension pulley further defines a plane through said center in said radial direction, said plane and said chain return section define a first distance therebetween, and said plane and said portion of said tension pulley section away from said chain return section define a second distance therebetween, and wherein said first distance is less than said second distance.

20. A method of assembling a bicycle rear derailleur, comprising:
   a. providing a pulley mounted to a plate, said plate having first and second sections, wherein said first section includes a protrusion defining a first thickness and said second section defines a second thickness, and said first thickness is greater than said second thickness;
   b. providing a bicycle chain;
   c. engaging said chain and said pulley to define a first distance between said chain and said first section of said plate and a second distance between said chain and said second section of said plate, such that said first distance is less than said second distance.

* * * * *